United States Patent
Smith

[15] 3,674,162
[45] July 4, 1972

[54] ROUGH TERRAIN VEHICLE

[72] Inventor: Robert M. Smith, Grayslake, Ill.

[73] Assignee: The Hy-Dynamic Co., Lake Bluff, Ill.

[22] Filed: Dec. 21, 1970

[21] Appl. No.: 100,210

[52] U.S. Cl. .................................214/138 R, 212/49
[51] Int. Cl. .................................................E02f 3/74
[58] Field of Search ...................214/138, 132, 135, 141; 180/77 S

[56] References Cited

UNITED STATES PATENTS

| | | | |
|---|---|---|---|
| 2,827,715 | 3/1958 | Wagner | 214/132 X |
| 2,995,261 | 8/1961 | Soyland et al. | 214/138 |
| 3,018,010 | 1/1962 | Przybylski | 214/138 |
| 3,224,608 | 12/1965 | Yadon et al. | 214/141 |
| 3,265,149 | 8/1966 | Schuetz | 180/77 S |
| 3,448,820 | 6/1969 | Aiello et al. | 180/77 S |

*Primary Examiner*—Philip Arnold
*Attorney*—Dawson, Tilton, Fallon & Lungmus

[57] ABSTRACT

A rough terrain vehicle such as a crane or backhoe which has a turntable mounted boom, the turntable also carrying a cab on one side of the boom and hydraulic valving means on the other side of the boom, the cab being equipped with sets of controls at each end and a reversible seat in-between so that the operator can face the proper direction for driving or material handling, irrespective of the disposition of the boom.

4 Claims, 4 Drawing Figures

Inventor
Robert M. Smith
by Dawson, Tilton, Fallon
& Lungmus
Atty's

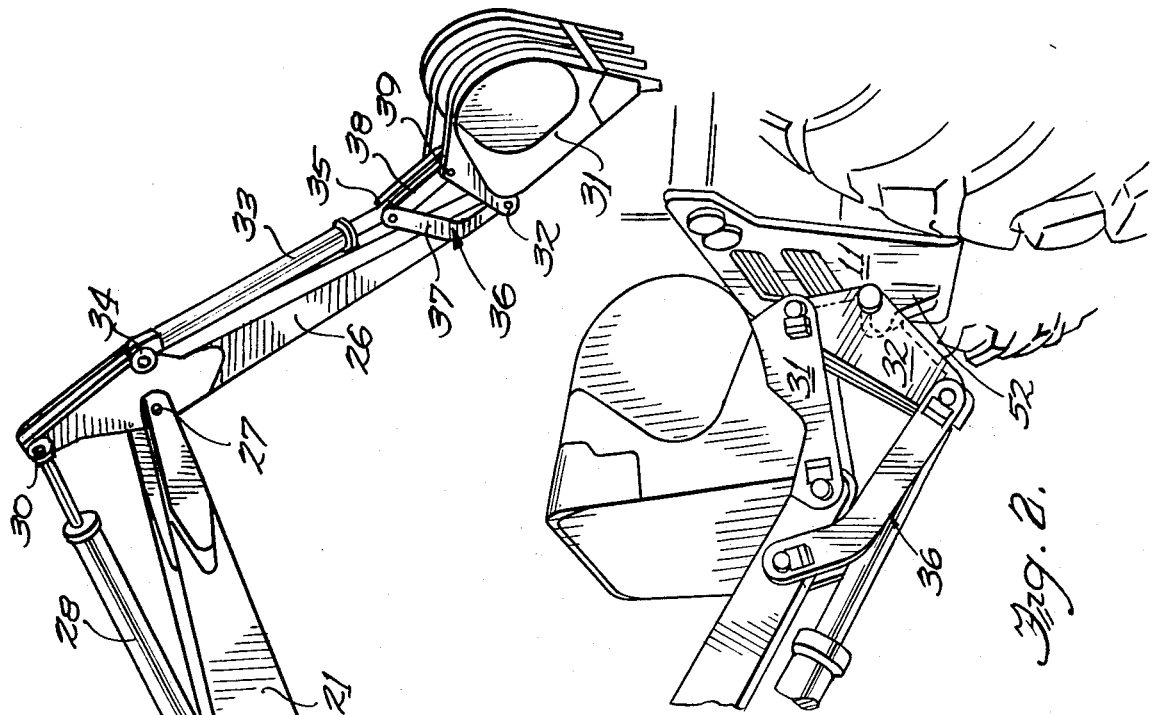
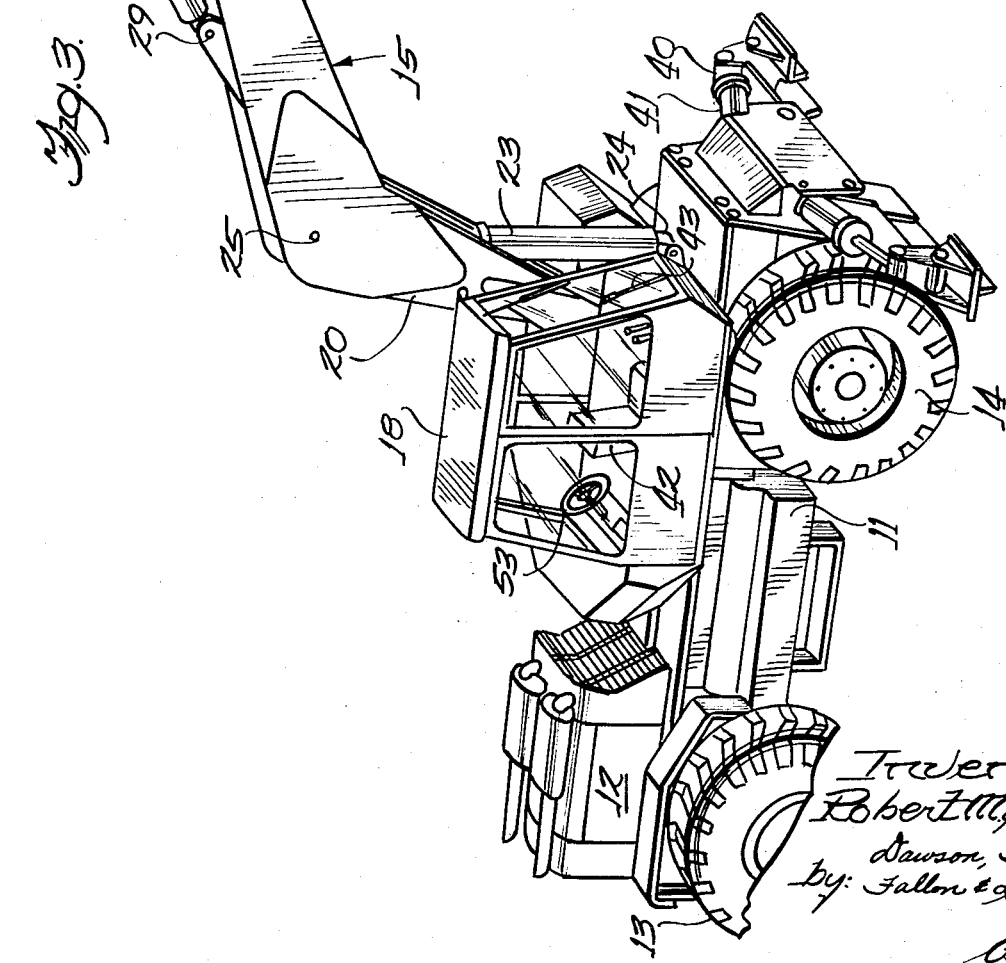

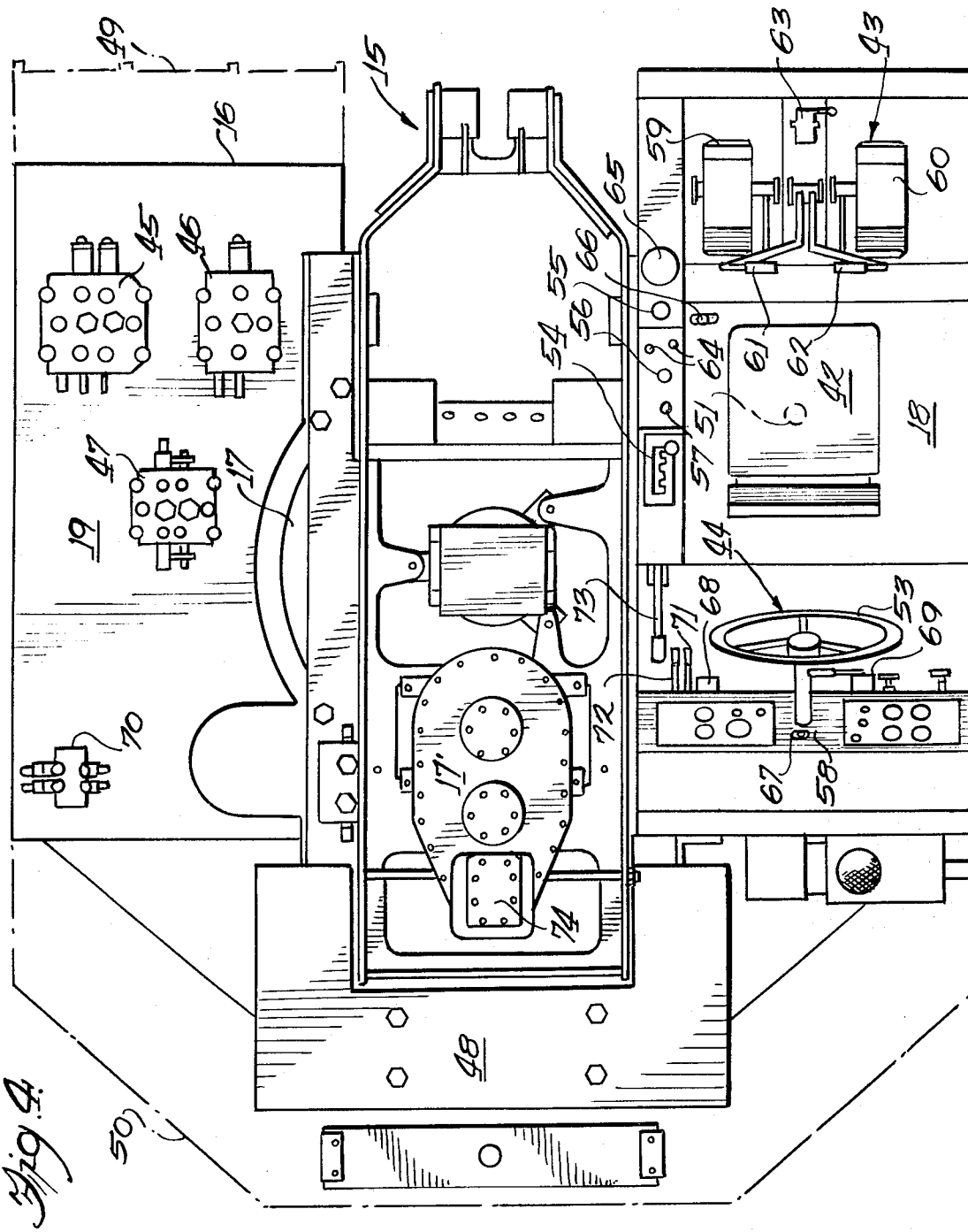

ROUGH TERRAIN VEHICLE

BACKGROUND AND SUMMARY OF INVENTION

Although there has been increasing use of mobile material-handling equipment such as cranes, backhoes, etc., there has been provided no versatile vehicle which is adapted for use both on rough terrain and highways with efficient changeover between the material-handling and driving (or "roading") functions. This is achieved through the teaching of the instant invention which provides a unique turntable arrangement on a self-propelled vehicle. A boom is mounted on the turntable, and on one side of the boom is provided a cab, while hydraulic valving means are provided on the other side. The cab has controls at each end and a reversible seat midway of the cab length. Thus, the operator can dispose the boom in a backward direction while driving and steering the vehicle in a forward direction, or can dispose the boom forwardly and operate the same while also looking forwardly.

DETAIL DESCRIPTION OF INVENTION

The invention is described in conjunction with an illustrative embodiment in the accompanying drawing, in which:

FIG. 2 is a fragmentary perspective view of the rear end of the vehicle in FIG. 1 and showing the supporting means for the bucket;

FIG. 3 is another perspective view of the vehicle of FIG. 1, but with the turntable and boom disposed in a material-handling (digging) aspect; and FIG. 4 is a fragmentary plan view of the superstructure of the vehicle seen in FIGS. 1 and 2.

Figure 1:
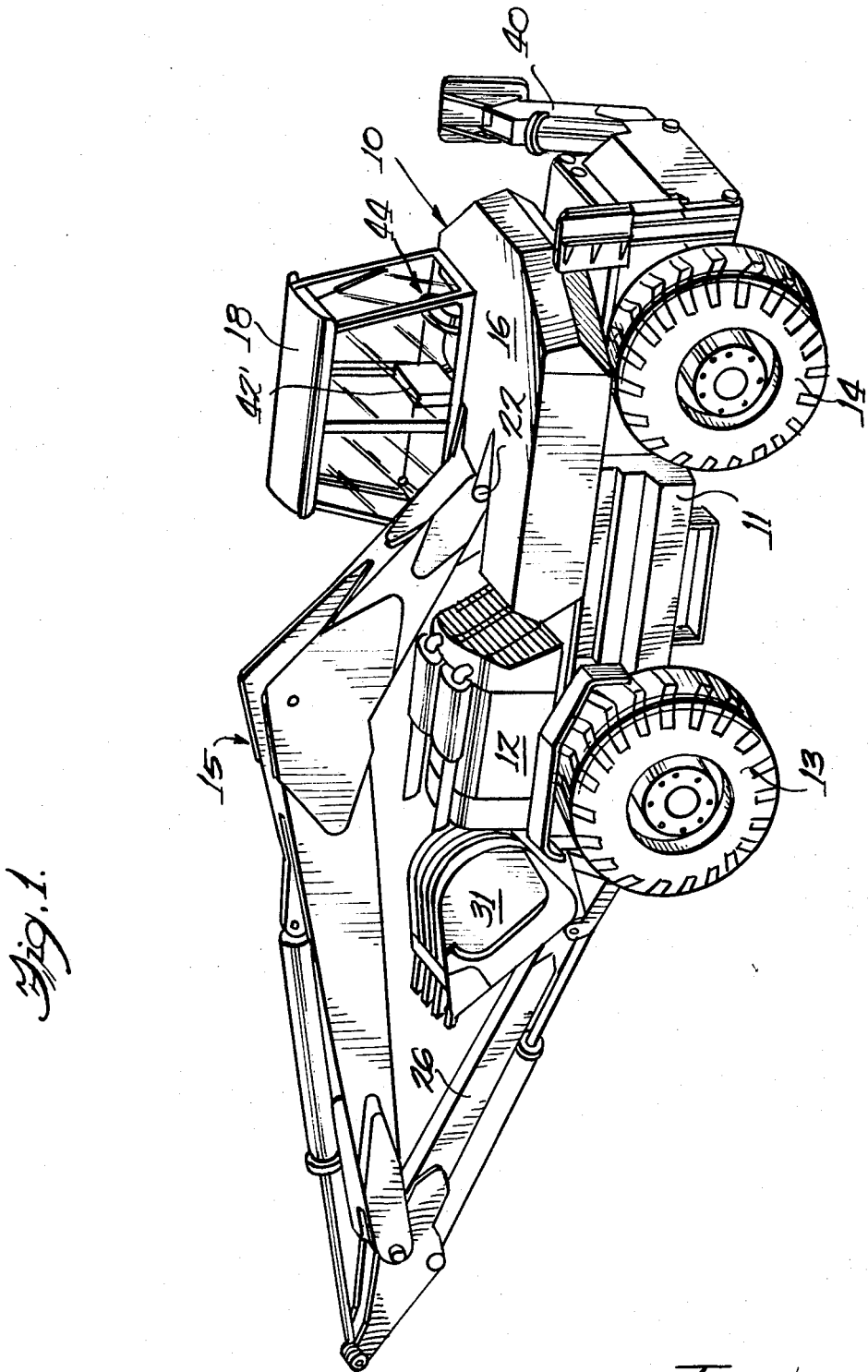
FIG. 1 is a perspective view of a vehicle incorporating teachings of the invention and shown with the material-handling portion, viz., the boom, etc., disposed in a condition for transport over the highway, to another site, etc.

In the illustration given, and with reference to FIG. 1, the numeral 10 designates generally a rough terrain vehicle which is illustrated in the form of a backhoe. The vehicle 10 includes a frame 11 which supports an engine 12 at the rear end thereof. The frame also includes rear wheels 13 and front wheels 14 which permit the vehicle to be self-propelled either over rough terrain or highways. By virtue of the arrangement depicted, the weight distribution when the boom is in the "roading" aspect is evenly distributed over the axles providing for improved steering control braking and tractive effort.

The material-handling portion includes a boom generally designated 15, which is pivotally mounted on a turntable 16. Suitable gearing, as at 17 (see the upper central portion of FIG. 4), is provided in conjunction with a gear box 17' (see the left central portion of FIG. 4) for rotating the turntable. The turntable is seen to include on one side of the boom a cab 18 which is relatively elongated in the direction of boom length. On the other side of the boom 15, the turntable 16 provides a chamber 19 (still referring to FIG. 4) which houses various hydraulic valves for controlling the operation of the backhoe.

The backhoe is disposed for digging in the perspective showing of FIG. 3. There, again, the boom is generally designated by the numeral 15 and is seen to be generally L-shaped in side elevation, having a lower portion 20 and an upper portion 21. The lower portion 20 is pivotally mounted on the turntable as at 22 (see FIG. 1) for movement through a vertical arc. Such movement is achieved through the operation of a cylinder and piston rod unit 23 which is pivotally connected to the turntable at 24 and to the boom 15 as at 25. The remainder of the backhoe includes a dipper stick 26 which is pivotally connected as at 27 to the outward end of the boom 15. Movement of the dipper stick through a vertical arc is achieved through a second cylinder and piston rod unit 28. The unit 28 is pivotally connected as at 29 to the boom 15, and at 30 to one end of the dipper stick 26.

The backhoe further includes a bucket 31 which is pivotally mounted as at 32 to the outboard end of the dipper stick, and vertical movement of the bucket is achieved through a third cylinder and piston rod unit 33. The unit 33 is pivotally connected at one end as at 34 to the dipper stick, and at the other end as at 35 to a linkage arrangement generally designated 36. The linkage arrangement includes a pair of generally L-shaped links 37 extending between the pivots 32 and 35, and a pair of bars 38 extending between the pivot 35 and a second pivot 39 provided on the bucket 31.

During digging, the stabilizers 40 are swung downwardly from the FIG. 1 disposition to that seen in FIG. 3 to engage the ground just forward to the front wheels 14, suitable cylinder and piston rod units, as at 41, being provided for this purpose. In the digging condition, it will be seen that the seat 42 is faced forwardly so that the operator faces the digging controls generally designated 43 and has a clear view of the operation of the bucket. On the other hand, during the "roading" condition, the turntable has been rotated 180° from that seen in FIG. 3 — to the condition seen in FIG. 1 — so as to dispose the boom 15 rearwardly. This positions the cab 18 on the left side of the vehicle 10, and with the steering controls generally designated 44 positioned forwardly. The seat has been rotated to the condition designated 42' in FIG. 1, so that the operator again has a clear, unobstructed view of what is forward of the vehicle 10.

By the provision of the various hydraulic valving means 45, 46 and 47 within the chamber 19, and positioning the chamber to one side of the boom, an extremely advantageous spatial arrangement is achieved. The cab is seen to be relatively elongated; yet there is a minimum of equipment forward of the cab, particularly in the "roading" condition. This permits the operator to ascertain all obstructions readily, and therefore handle the relatively heavy vehicle with ease and assurance. I do provide a substantial counterweight 48 (see only in FIG. 4) at the end of the turntable 16 opposite the end over which the boom extends, i.e., the forward end of the turntable when the turntable is in the "roading" condition. The counterweight 48 is seen to be essentially C-shaped and straddles the portion of the turntable carrying the means for turntable rotation. Suitable flexible cables (not shown) couple the digging controls 43 with the various hydraulic valving means 45–47. Additionally, I provide grill work at both ends of the chamber 19, as at 49 and 50, so that airflow is induced to maintain these mechanisms cool.

In the operation of the vehicle 10 for digging or other material handling, the operator positions the set 42 in the condition seen in FIGS. 3 and 4, as by rotating the same about a central post 51. This permits the operator to manipulate the various controls 43 for rotating the turntable, for elevating and lower the boom 15, for elevating and lowering the dipper stick 26, and for swinging the bucket 31 about a horizontal axis.

After the material-handling operation has been completed, pipe-laying, excavating, etc., and it is desired to relocate the vehicle, the backhoe is disposed in the condition seen in FIG. 1. For that purpose the piston rod of unit 23 is substantially retracted so as to lower the boom — as can be appreciated from a comparison of FIGS. 1 and 3. However, the piston rods of the units 28 and 33 (serving the dipper stick 26 and bucket 31, respectively) are extended, which results in the bucket being curled up under the boom and with the pivot rod 32 being supported on hook 52 provided on the rear of the vehicle 10 — this being seen in fragmentary perspective view in FIG. 2. This results in an advantageous low profile and short over all length of the vehicle during self-propelled operation over a road or other terrain. The extension of the rods of the units 28 and 33 results in a backhoe being essentially locked during the traveling condition to provide further stability in combination with the advantageous low profile and short length. In this arrangement with the backhoe disposed in the carrying condition, an equal distribution of the weight over the axles is achieved.

It will be appreciated, however, that the vehicle can be self-propelled with the backhoe in the digging condition, viz., that seen in FIG. 3. Such self-propulsion is desirable during trenching, for example, where the vehicle should be moved to a different position to continue the trench. When this is the case, the operator usually is not unduly concerned with steering, because the movement may be for only a short distance. The vehicle can be self-propelled by the operators sitting in the seat 42 facing the bucket, as is the condition depicted in FIG. 3. Steering can be controlled by merely reaching rearwardly to the steering wheel 53 to make minor adjustments in the direction of vehicle movement. I provide a transmission shift mechanism 54 (seen only in FIG. 4) alongside of the operator's seat 42. This normally would be operated by the right hand of the operator when driving along the road, i.e., facing the steering controls 44, but can be operated by his left hand to shift transmission during limited movement while the cab is disposed in the material-handling condition. I also provide for auxiliary operation a hand throttle as at 55, and an auxiliary airbrake 56. These are additional to the regular throttle and airbrake provided as part of the driving controls 44. Still further, I provide an emergency shut-down switch 57 which is separate from the panel ignition switch provided on the panel 58. Thus, a versatile vehicle is provided which facilitates operation both during roading and material-handling.

For the operation of the digging unit, the controls 43 are provided which include a bucket control pedal 59 (see the lower right hand portion of FIG. 4) and a dipper stick control pedal 60. The hand levers 61 and 62 are the swing control and boom control mechanisms respectively. The numeral 63 designates the airbrake, while the numeral 64 designates the controls for the stabilizers or outriggers 40. A tachometer 65 also is provided for convenient viewing by an operator on the seat 42. Duplicate horn buttons are provided at 66 (for the operators's use when facing the dipper stick) and at 67 (for use when facing the steering wheel 53). When driving the vehicle during the "roading" condition, a throttle 68 is provided in the form of a foot pedal, and a brake pedal 69 is also provided.

Still referring to FIG. 4, the numeral 45 designates that hydraulic valving means which controls the dipper stick and bucket. The numeral 46 controls the boom, while the valving at 47 controls the swing of the boom 15.

The numeral 70 designates a steering selector valve. This is operated by a steering selection control 71 provided within the cab 18. Also provided is a steering direction control lever as at 72 and a brake lever 73 for the turntable 16. The swing gear box 17' is powered by a swing driver motor 74. Thus, I have provided suitable and useful controls in a fashion that permits maximum efficiency of use of the equipment.

I claim:

1. A material handling vehicle adapted for rough terrain usage comprising a frame, front and rear wheels on said frame, an engine on said frame adjacent said rear wheels and coupled to the same for propelling said vehicle, a turntable rotatably mounted on said frame intermediate said front and rear wheels, a boom pivotally mounted at its inboard end on said turntable and equipped with material-handling means at its outboard end, hydraulic valving means mounted on said turntable on one side of said boom for moving said boom through a vertical arc, a cab on said turntable on the other side of said boom from said hydraulic valving means and relatively elongated in the direction of boom length, said boom being collapsible to a position rearwardly so as to provide unobstructed visibility on both sides of said cab, said cab being equipped with a set of controls at each end thereof, the control set adjacent the material-handling means being coupled to said hydraulic valving means for operating said boom and for rotating said turntable so as to move said boom through a horizontal arc, the control set at the other end of said cab being coupled to said wheels for control of said vehicle during self-propelled operation over a road, an operator seat midway between said control sets in said cab, said seat being mounted for rotary movement about a generally vertical axis whereby said material-handling means is adapted to be operated by an operator seated in said seat when said material-handling means is positioned forwardly of said front wheels and whereby said vehicle is adapted to be controlled for forward self-propulsion by an operator sitting in said seat with said material-handling means positioned aft of said rear wheels.

2. The structure of claim 1 in which said material-handling means is a backhoe comprising a dipper stick adjacent one end thereof being pivotally mounted on said boom adjacent said outboard end, a bucket pivotally mounted on the other end of said dipper stick, cylinder and piston rod units coupled to said boom, dipper stick, and bucket for moving the dipper stick and bucket through vertical arcs, and bucket support means on the rear of said frame for supporting said bucket with said units having the piston rods thereof extended to provide a low, locked profile for said vehicle when self-propelled over a road.

3. The structure of claim 2 in which said frame is equipped with a hook constituting said bucket support means, said backhoe having a horizontally extending pivot rod interconnecting said dipper stick and backhoe, said pivot rod being receivable within said hook to support said backhoe during self-propelled movement of said vehicle.

4. The structure of claim 1 in which said cab is equipped with a third set of controls intermediate the ends thereof and operable by an operator facing said material-handling means for controlling self-propelled movement of said vehicle.

* * * * *